United States Patent [19]

Hunter et al.

[11] Patent Number: 4,989,477
[45] Date of Patent: Feb. 5, 1991

[54] DOUBLE TRANSITION CLOSED THROTTLE DOWNSHIFT CONTROL IN AN AUTOMATIC TRANSMISSIONS

[75] Inventors: Joseph H. Hunter; Kenneth B. Harmon, both of Carmel, Ind.

[73] Assignee: General Motors Corporation, Detroit, Mich.

[21] Appl. No.: 463,719

[22] Filed: Jan. 11, 1990

[51] Int. Cl.$^5$ .............................................. B60K 41/06
[52] U.S. Cl. ........................................ 74/866; 74/867; 74/336 R
[58] Field of Search .................... 74/336 R, 867, 866; 364/424.1

[56] References Cited

U.S. PATENT DOCUMENTS

| | | | |
|---|---|---|---|
| 4,023,443 | 5/1977 | Usui et al. | 74/866 |
| 4,073,204 | 2/1978 | Dick | 74/866 |
| 4,653,351 | 3/1987 | Downs et al. | 74/866 |
| 4,709,596 | 12/1987 | Boda et al. | 74/866 X |
| 4,722,247 | 2/1988 | Shindo et al. | 74/866 |
| 4,742,732 | 5/1988 | Hiramatsu | 74/866 |
| 4,790,418 | 12/1988 | Brown et al. | 74/336 R X |
| 4,793,216 | 12/1988 | Hiramatsu et al. | 74/866 |
| 4,796,490 | 1/1989 | Butts et al. | 74/866 |
| 4,855,914 | 8/1989 | Davis et al. | 74/866 X |

Primary Examiner—Dwight Diehl
Assistant Examiner—Matthew Stavish
Attorney, Agent, or Firm—Mark A. Navarre

[57] ABSTRACT

In an automatic transmission, a double transition closed throttle downshift to a target range requires the release of two off-going clutches and the engagement of two on-coming clutches. The shift is made in two stages. The first stage involves a first off-going clutch and a first on-coming clutch and effects an upshift to a third range having a speed ratio lower than both the initial range and the target range, so that a momentary input speed decrease occurs. The speed decrease is managed by a closed-loop control of the first on-coming clutch until the clutch reaches a synthronous speed for the third range. The second stage is a downshift from the third ratio to the second ratio by a second off-going clutch and a second on-coming clutch and results in a speed increase. The second on-coming clutch is also managed by a closed-loop control. In each case, the closed-loop control parameter is on-coming clutch slip speed which is controlled to a calculated slip speed profile.

6 Claims, 14 Drawing Sheets

| RANGE | C1 | C2 | C3 | C4 | C5 | C6 |
|---|---|---|---|---|---|---|
| L0 |  |  | X |  |  | X |
| 1 | X |  |  |  | X |  |
| 2 | X |  |  | X |  |  |
| 3 | X |  | X |  |  |  |
| 4 | X | X |  |  |  |  |
| 5 |  | X | X |  |  |  |
| 6 |  | X |  | X |  |  |
| R |  |  | X |  | X |  |

DOUBLE TRANSITION CLOSED THROTTLE DOWNSHIFT CONTROL IN AN AUTOMATIC TRANSMISSIONS

FIELD OF THE INVENTION

This invention relates to a method of controlling a shift in an automatic transmission, and more particularly, for a double transition closed throttle downshift.

BACKGROUND OF THE INVENTION

Generally, a motor vehicle automatic transmission includes a number of gear elements coupling its input and output shafts, and a related number of torque establishing devices, such as clutches and brakes which are selectively engageable to activate certain gear elements for establishing a desired speed ratio between the input and output shafts. The brake can be of the band type or disk type; engineering personnel in the automotive art refer to disc type brakes in transmissions as "clutches" or "reaction clutches". As used herein, the terms "clutches" and "torque transmitting devices" will be used to refer to brakes as well as clutches.

The input shaft is connected to the vehicle engine through a fluid coupling, such as a torque converter, and the output shaft is connected directly to the vehicle wheels. Shifting from one forward speed ratio to another is performed in response to engine throttle and vehicle speed, and generally involves releasing or disengaging the clutch (off-going) associated with the current speed ratio and applying or engaging the clutch (on-coming) associated with the desired speed ratio. In this disclosure, a double transition closed throttle downshift is featured wherein two clutches associated with the current speed ratio are released and two other clutches associated with the desired or target speed ratio are engaged.

The speed ratio is defined as the transmission input speed or turbine speed divided by the output speed. Thus, a low gear range has a high speed ratio and a higher gear range has a lower speed ratio. To perform a downshift, a shift is made from a low speed ratio to a high, or target, speed ratio. In the type of transmission involved in this invention, the downshift from first range to low range is accomplished by disengaging two clutches associated with the lower speed ratio, and engaging two clutches associated with the higher speed ratio to thereby reconfigure the gear set to operate at the higher speed ratio. Shifts performed in the above manner require precise timing in order to achieve high quality shifting. In the case of closed throttle double transition downshifts, particular care must be taken to avoid clutch tie-up or a momentary shift to neutral or reverse during the shift.

SUMMARY OF THE INVENTION

It is an object of the invention to provide a method of controlling a closed throttle downshift in an automatic transmission by engaging first one clutch and then another clutch in a controlled manner while disengaging two other clutches and using transmission speed feedback to manage the control. In particular, a motor vehicle automatic transmission with an electronic control system achieves high quality double transition closed throttle downshifts by first upshifting to a range higher than the target range and then downshifting to the target range.

BRIEF DESCRIPTION OF THE DRAWINGS

The above and other advantages of the invention will become more apparent from the following description taken in conjunction with the accompanying drawings wherein like references refer to like parts and wherein:

FIG. 1b is a diagram illustrating the clutch engagements required to establish the various speed ratios of the transmission depicted in FIG. 1a.

FIGS. 2 and 3a–3b are flow diagrams representative of computer program instructions executed by the computer based controller of FIG. 1a in carrying out the shift control of the transmission.

DETAILED DESCRIPTION OF THE INVENTION

Figure 1A:
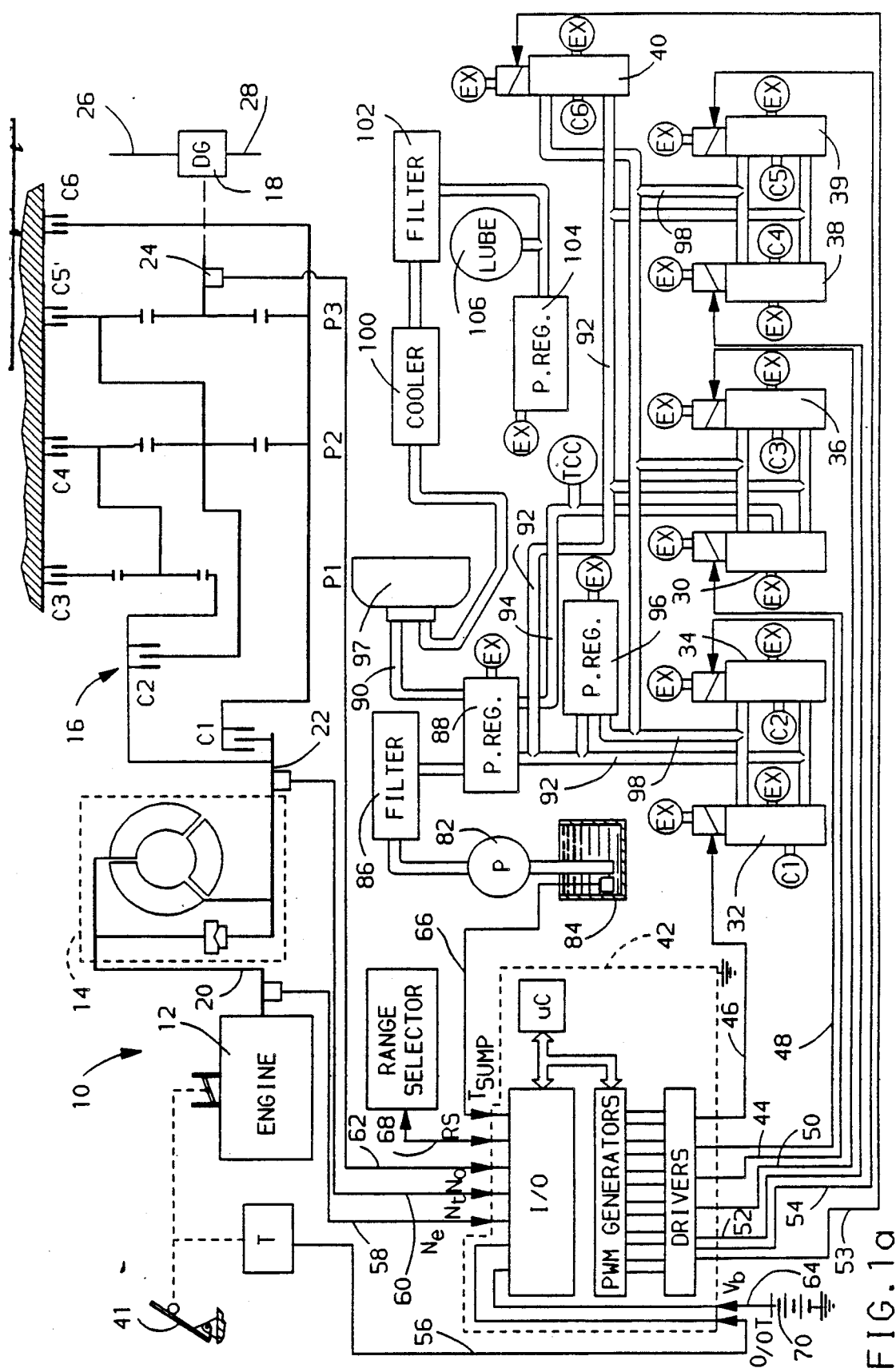
FIG. 1a is a system diagram of a fluid operated motor vehicle transmission, including several solenoid operated fluid pressure control valves and a computer-based control unit for carrying out the voltage control technique of this invention.

Referring now to the drawings, and more particularly to FIG. 1a, the reference numeral 10 generally designates a motor vehicle drive train including a throttled internal combustion engine 12, a fluidic torque converter 14, a seven-speed fluid operated power transmission 16 and a differential gear set (DG) 18. The engine 12 is connected to the torque converter 14 via shaft 20, the torque converter 14 is connected to the transmission 16 via shaft 22, the transmission 16 is connected to the differential gear set 18 via shaft 24 and the differential gearset is connected to a pair of drive wheels (not shown) via the prop shafts 26 and 28.

Gear shifts are accomplished by selectively engaging and disengaging brakes and clutches, herein called torque transmitting devices or clutches. These clutches are actuated by hydraulic pressure and upon engagement require a fill time before torque is transmitted between a driving and a driven friction element.

The speed and torque relationships between the engine 12 and the drive wheels of the vehicle are controlled by a fluid operated torque converter clutch, designated TCC, and six fluid operated transmission clutches, designated C1–C6. The torque converter clutch TCC is selectively engaged by the solenoid operated control valve 30 to mechanically connect the impeller I and turbine T of torque converter 14. The clutches TCC, C1, C2, C3, C4, C5, C6 are selectively engaged and disengaged by the solenoid operated control valves 30, 32, 34, 36, 38, 39, 40 according to the diagram shown in FIG. 1b, to selectively establish a desired transmission speed ratio. That diagram shows that to downshift from first to low range, clutches C1 and C5 are released and clutches C3 and C6 are engaged. The illustrated transmission gear set provides one reverse ratio and seven forward ratios. An operator manipulated accelerator pedal 41 positions the engine throttle for controlling the engine power output.

The operation of the solenoid operated control valves 30–40 is controlled by a computer-based control unit 42 via lines 44–54 in response to various input signals representative of system parameters. Such inputs include an engine throttle position signal % T on line 56, an engine output shaft speed signal Ne on line 58, a torque converter output shaft speed signal Nt on line 60, a transmission output shaft speed signal No on line 62, a system supply voltage signal Vb on line 64, a transmission fluid temperature signal Tsump on line 66 and an operator range selector position signal RS on line 68. The system voltage is supplied by the storage battery 70, and the input signals are obtained with conventional electrical transducers such as potentiometers, thermistors and magnetic speed pickups.

Internally, the control unit 42 comprises a number of conventional devices including a microcomputer (uC) with internal clock and memory, an input/output device (I/O) and an array of PWM generators (PWM) and drivers (DR). As indicated below, a PWM generator and a driver (DR) are dedicated to each solenoid control valve 30–40. The PWM outputs are delivered to the respective drivers (DR) and are used to energize the respective solenoid control valves. The duty cycle of the PWM outputs determines the hydraulic pressure supplied by the solenoid control valves, with a low percent duty cycle yielding a low pressure and a high percent duty cycle yielding a high pressure for a normally closed valve.

The hydraulic circuit of transmission 16 includes a positive displacement pump 82 for supplying pressurized hydraulic fluid from the sump or reservoir 84, to the clutches TCC and C1–C6 through various hydraulic and electro-hydraulic valving mechanisms. After passing through a main circuit filter 86, the fluid output of pump 82 is directed to a main pressure regulator valve 88 which develops regulated fluid pressures in lines 90 and 92.

The fluid in line 90, generally referred to as converter feed pressure, is directed through the torque converter 14, as schematically designated by the converter shell 97. After passing through a cooler 100 and cooler filter 102, the converter fluid is then regulated down to a lower pressure by the regulator valve 104 and directed to the transmission lube circuit, as designated by the bubble 106.

The fluid in line 92, generally referred to as main or line pressure, is supplied as an input to the clutch control valves 30–40, and also to the control pressure regulator valve 96. The control pressure regulator valve 96 develops a somewhat lower pressure in line 98, referred to herein as the control pressure, such pressure being directed to the solenoid of each control valve 30–40.

The fluid in line 94, referred to as the converter clutch pressure, is supplied directly by solenoid 30 to the torque converter clutch TCC to engage the same. This pressure is also supplied to the main regulator valve 88 to provide a lower regulated line pressure in the converter lock-up mode.

Figures 1B, 2:
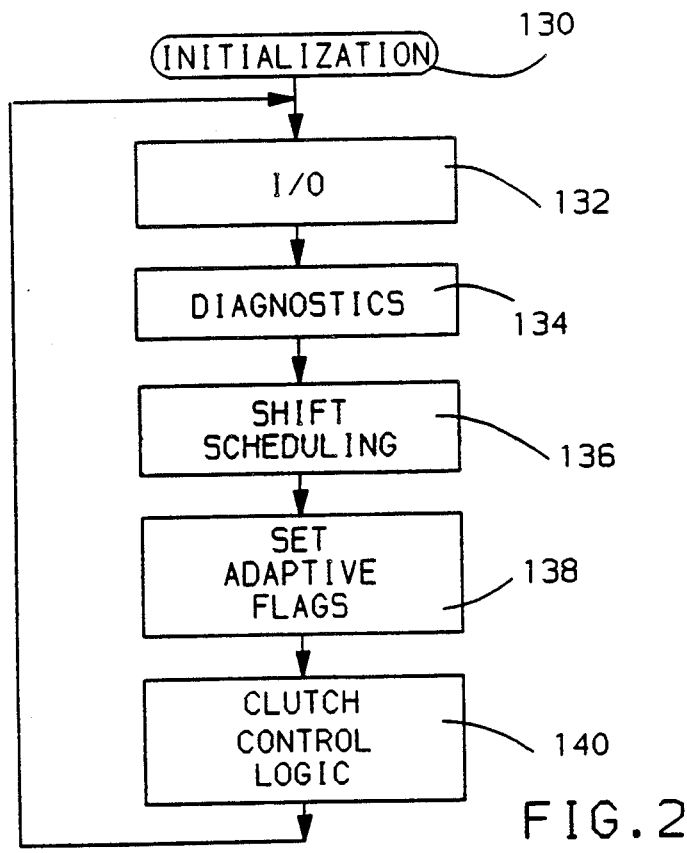

FIGS. 2, 3a–3b and 6–14 are flow diagrams representative of computer program instructions executed by the computer-based control unit 42 of FIG. 1 in carrying out the shift control technique of this invention. In the description of the flow diagrams, other than FIG. 2, the functional explanation marked with numerals in angle brackets, <nn>, refers to blocks bearing that number.

FIG. 2 represents an executive or main loop program which directs the sequential execution of various subroutines. Block 130 designates a series of instructions executed at the initiation of each period of vehicle operation for setting the various timers, registers and variable values of control unit 42 to predetermined initial values. Thereafter, the blocks 132–140 are sequentially and repeatedly executed as indicated by the flow diagram lines. Block 132 reads the various input signal values and outputs the required control signals to the PWM generators and drivers for solenoid controlled valves 30–40. Blocks 134–138 contain diagnostic, shift scheduling, and adaptive flag logic. The clutch control logic block 140 analyzes the various system input signals described above in reference to FIG. 1a, develops pressure command signals PCMD for application to the solenoid operated control valves at the next execution of block 132, and computes adaptive corrections based on the adaptive flags at shift completion. Block 140 also effects pulse-width-modulation of the solenoid drive voltage to carry out the pressure commands for specific shift operations. Block 140 is detailed in the flow chart of FIGS. 3a–3b.

Figure 3A:
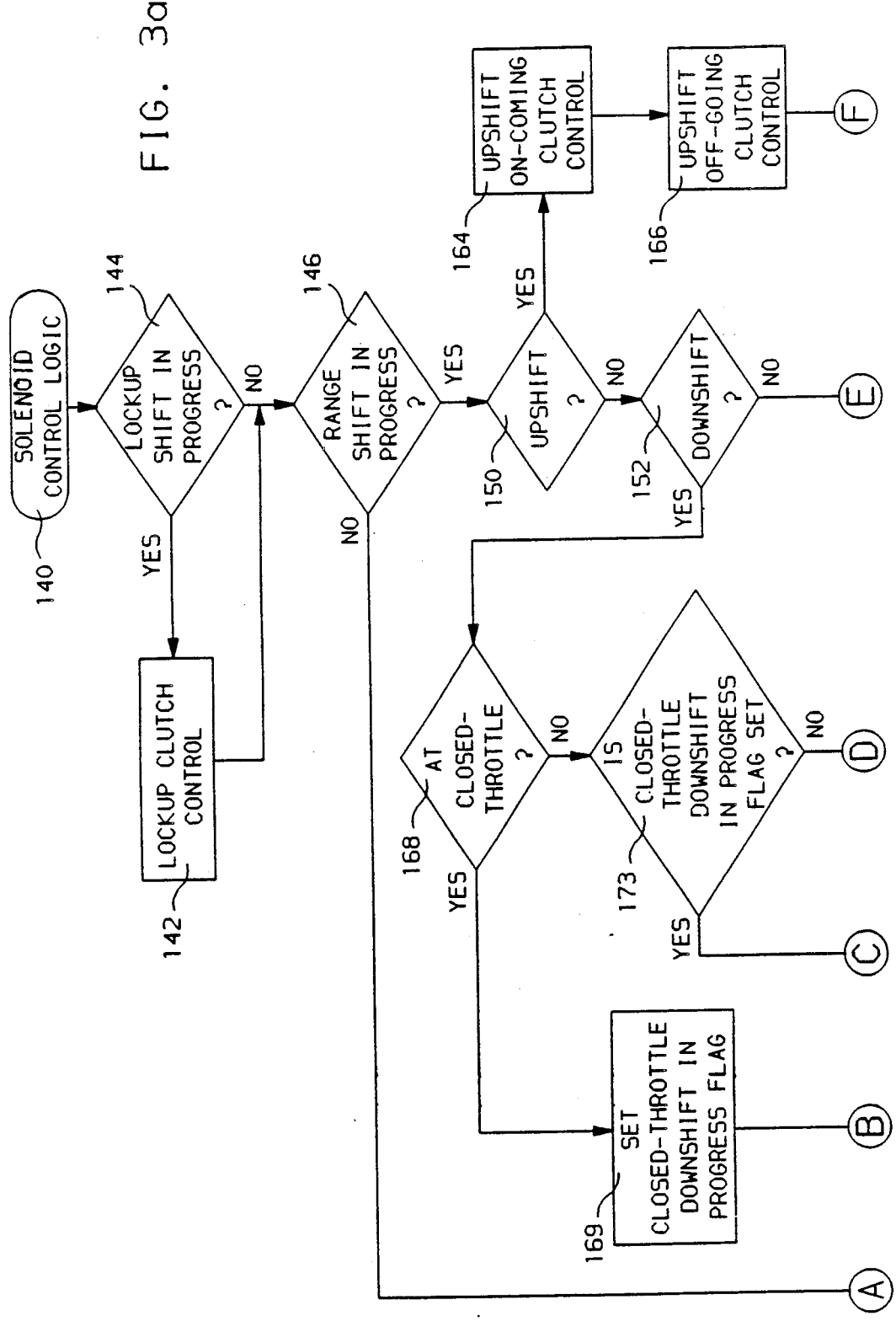
Figure 3B:
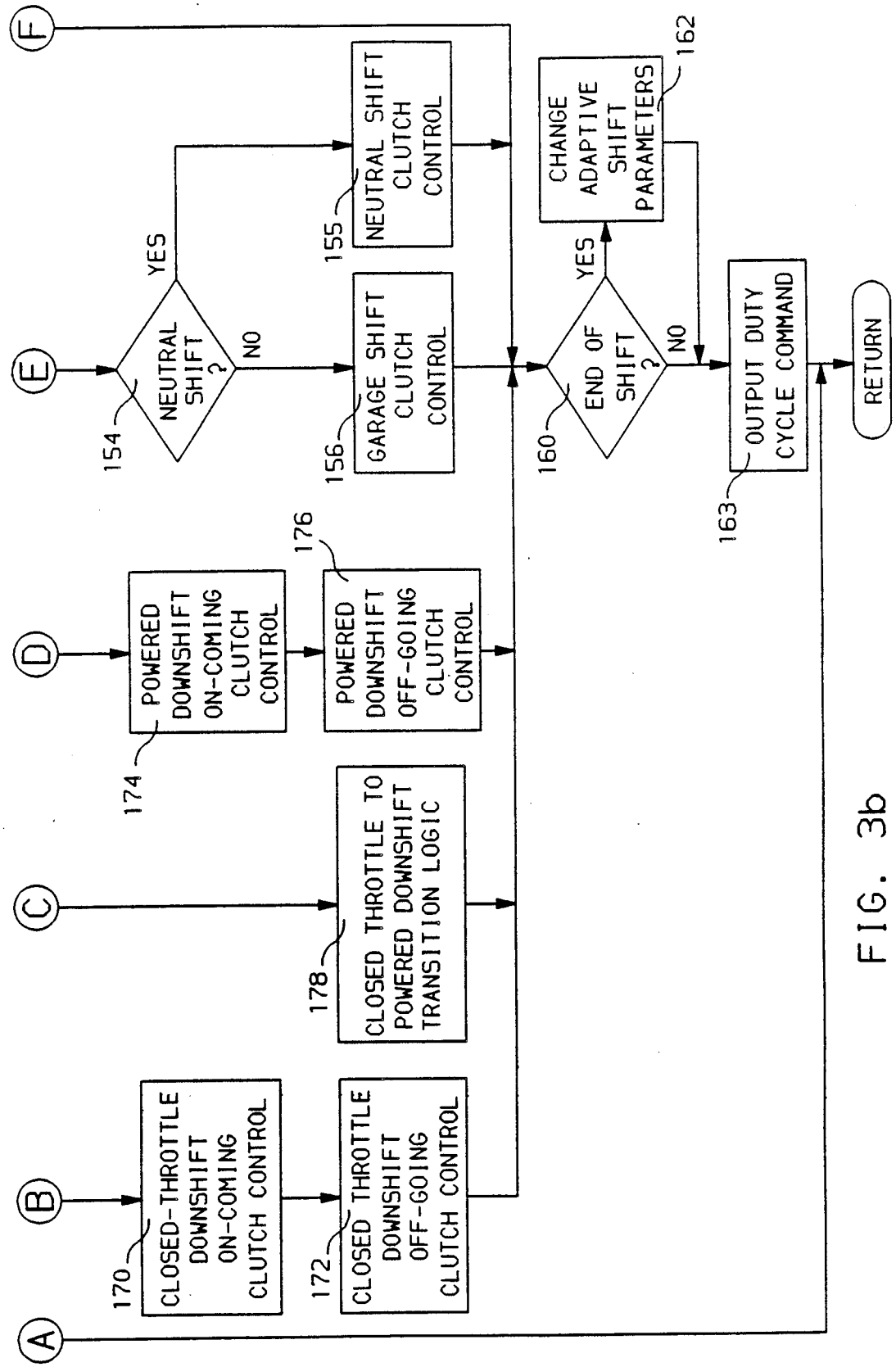

The flow diagram of FIGS. 3a–3b sets forth the program for making decisions as to the type of range shift in progress, if any, and determines the specific control for the on-coming and the off-going clutches. The program also checks whether a shift has performed within specifications, and if not, certain shift parameters are changed at shift completion according to predefined adaptive logic to correct the shift. First, lockup clutch control is executed <142> if a lockup shift is in progress <144>. Then it is determined (from the shift schedule) whether a range shift is in progress <146>. If not, the clutch control logic is exited. If a range shift is in progress <146>, it is determined whether it is an upshift <150>, a downshift <152>, a neutral shift <154>, or a garage shift <156>. A garage shift is a shift from neutral to either drive or reverse, or a shift from drive to reverse or from reverse to drive. The control flows from either the upshift, downshift, neutral shift or the garage shift block to the end-of-shift test <160>. Once the shift is completed <160>, adaptive shift parameters are changed if required <162> and the duty cycle command is output <163>. If the shift has not ended <160>, the duty cycle command is output <163> before returning to the main loop of FIG. 2.

If an upshift is indicated <150>, the upshift on-coming clutch control <164> and the upshift off-going clutch control <166> are activated. If a downshift is indicated <152>, it is next decided whether it is a closed throttle downshift or a powered downshift <168>. If it is closed throttle, a closed throttle in progress flag is set <169>, the closed throttle on-coming clutch control is activated <170> and the closed throttle off-going clutch control is activated <172>. If the downshift is not at closed throttle <168>, the closed throttle flag is checked <173>. If the flag is not set, the powered downshift on-coming clutch control <174> and the powered downshift off-going clutch control <176> are activated. If the closed throttle flag is set <173>, the throttle opened during the course of the closed throttle downshift and a transition to powered downshift may be necessary; in such case, the appropriate transition logic is invoked <178>. If the shift is a neutral shift <154>, the neutral shift clutch control executes shifts from drive to neutral or from reverse to neutral <155>.

Each control phase operates by setting pressures, pressure increments, times or other values to predefined calibrated values which are herein generally called "set", "preset", "given" or "certain" values. Each such value is chosen from a table of calibrated values for each specific transmission condition, throttle range and shift type. Thus, different values are supplied for upshift, downshift, etc. as well as each range shift, e.g., 1–2, 2–1, 4–3, 5–4, etc. Converter and lockup modes may also require separate sets of calibration values.

Figure 4:
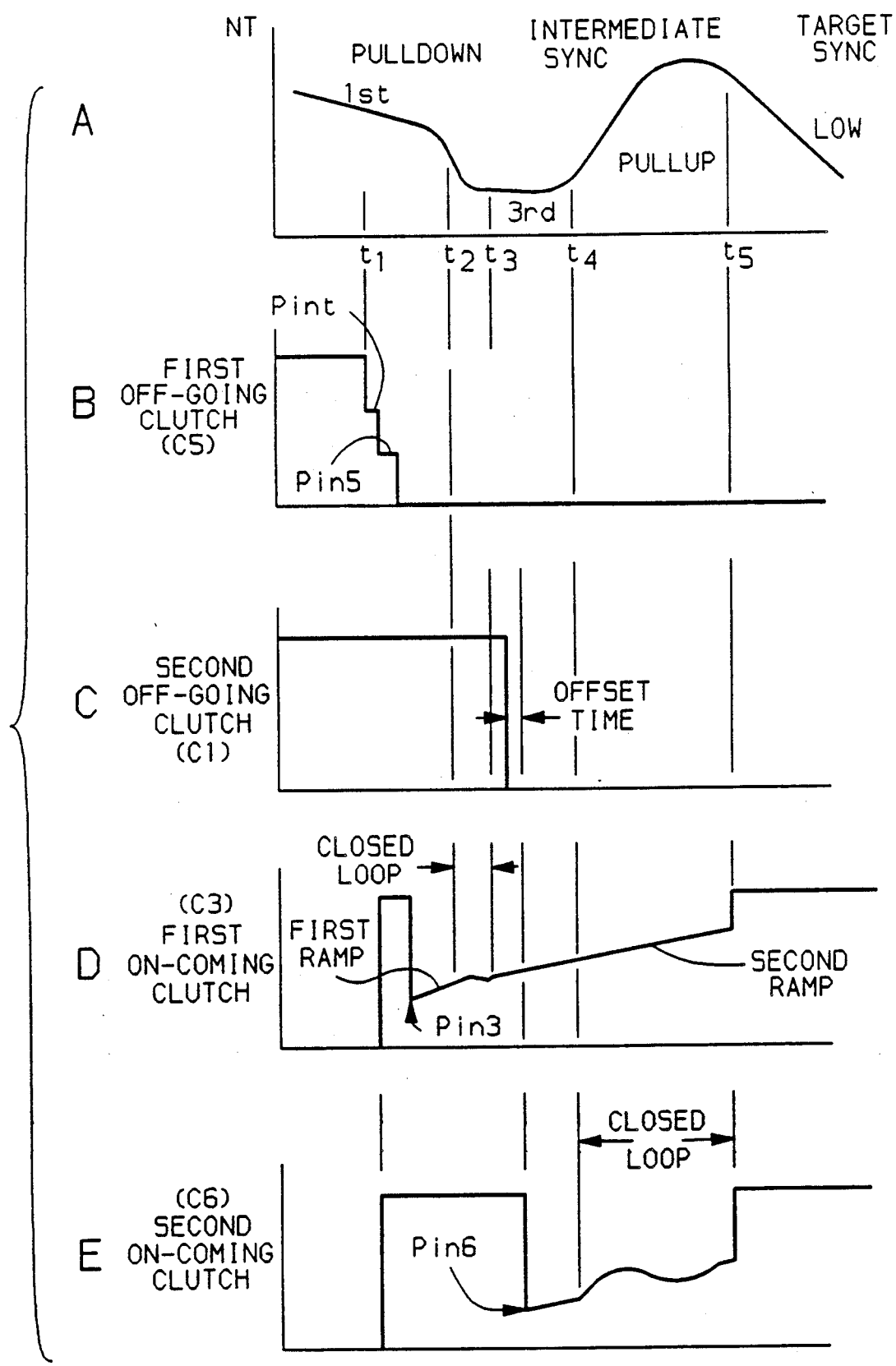
FIG. 4 graphs A, B, C, D and E illustrate turbine speed, first and second off-going pressure commands and first and second on-coming pressure commands, respectively, for double transition shifting according to the invention.

FIG. 4, graphs A, B, C, D and E, detail the controlled clutch pressures for a closed throttle downshift from first to low range, as well as the turbine speed or input speed. Graph A is a graph of turbine speed Nt versus time, graph B shows the commanded pressure versus time for the first off-going clutch C5, graph C shows the commanded pressure versus time for the second off-going clutch C1, graph D shows the commanded pressure versus time for the first on-coming clutch C3, and graph E shows the commanded pressure versus time for the second on-coming clutch C6. The clutches are controlled in a manner to effect a transition (upshift) from first range to third and, as soon as third range is achieved, to effect a second transition (downshift) from third range to low range.

The curve of graph A is typical for the case of decreasing vehicle speed prior to shift initiation at time t1, and indicates the turbine speed during the first range, the speed decrease during shifting to third range, the speed increase during shifting from third range to low range, and the speed decrease at a higher level after shifting to low range. Turbine speed pulldown is detected at time t2 by sensing when the turbine speed falls a set amount K1 below the product of output speed No and the first range speed ratio SR1, or Nt<(No * SR1)−K1. The speed after shifting to third range (after time t3) is "intermediate synchronous speed", i.e., the turbine speed Nt is within a window about the product of the output speed No and the third (intermediate) range speed ratio, SR3, or Nt is within [(No * SR3)±K2].

The detection of the intermediate synchronous speed triggers the shift from third range to low range. That shift causes pullup at time t4. The turbine pullup is defined by Nt>(No *SR3)+K3. The time t5 is the end of the shift as determined by "target synchronous speed" being detected in a set number of consecutive computer control loops. The target sync is defined as Nt being within the window [(No * SRL)±K4], where SRL is the speed ratio of the low range. Each of the "K" terms is a calibrated constant to establish a desired window or zone size.

Referring to FIG. 4, graphs B, D and E, it may be observed that initially, at the time t1 of the shift command, the pressure commands for the on-coming clutches C3 and C6 are set to the maximum pressure value to begin filling the clutch cavities. The pressure on off-going clutch C5 is reduced to an intermediate value, Pint, for a brief time and is then reduced to an initial value, Pin5. At the end of the fill period of the first on-coming clutch C3, the first off-going clutch C5 is released. The brief intermediate value, Pint, is effective to reduce clutch pressure undershoot caused by solenoid dynamics. The initial value Pin5 is sufficient to insure maintenance of the first range until the first on-coming clutch C3 can assume some torque capacity.

For the first on-coming clutch C3, graph D shows that maximum pressure is commanded for a fill time, beginning at time t1. The fill time allows nearly complete stroking of the clutch plates and obtains clutch torque capacity. Then the command pressure drops to an initial value, Pin3, and ramps up slowly at a first ramp rate until it causes turbine pulldown at time t2. The combination of the on-coming upward ramp and the release of the off-going clutch C5 results in a torque transition from the first off-going clutch C5 to the first on-coming clutch C3.

When the pulldown is detected at time t2 the first on-coming clutch C3 enters a closed-loop control period wherein the pressure is adjusted to maintain its slip speed close to a calculated slip speed profile. When the turbine speed Nt reaches intermediate range synchronization at time t3, it is assured that the first off-going clutch C5 is off and the first on-coming clutch C3 has assumed torque capacity. At the detection of a set number of intermediate range syncs, the first on-coming clutch C3 is commanded on at a second ramp rate.

During the above events, the second on-coming clutch C6 has been filled, and after a preset fill time, is commanded to an initial value Pin6 and then ramped upwardly. The second off-going clutch C1 is released an offset time before the end of the fill time of the second on-coming clutch C6. This early release allows for clutch exhaust time delays and reduces torque tie-up between the second off-going and second on-coming clutches C1, C6.

The ramp application of the second on-coming clutch C6 in conjunction with the already applied on-coming clutch C3 now results in a pullup at time t4 toward the target range. When pullup is detected, the second on-coming clutch C6 begins a closed-loop control phase to control its slip speed to a slip speed profile. This control phase continues until time t5 when a set number of target range syncs (or above syncs) have been detected, at which time the shift is completed and both on-coming clutches C3 and C6 are fully applied by commanding maximum pressure.

The closed throttle downshift has several features which contribute to smooth and efficient operation. A controlled ratio between the turbine and output is maintained throughout the shift thereby eliminating possible operation in neutral or reverse. Events such as pulldown, pullup and target range synchronization are used to control clutch application and release thereby providing controlled timing of the clutches.

Figure 5:
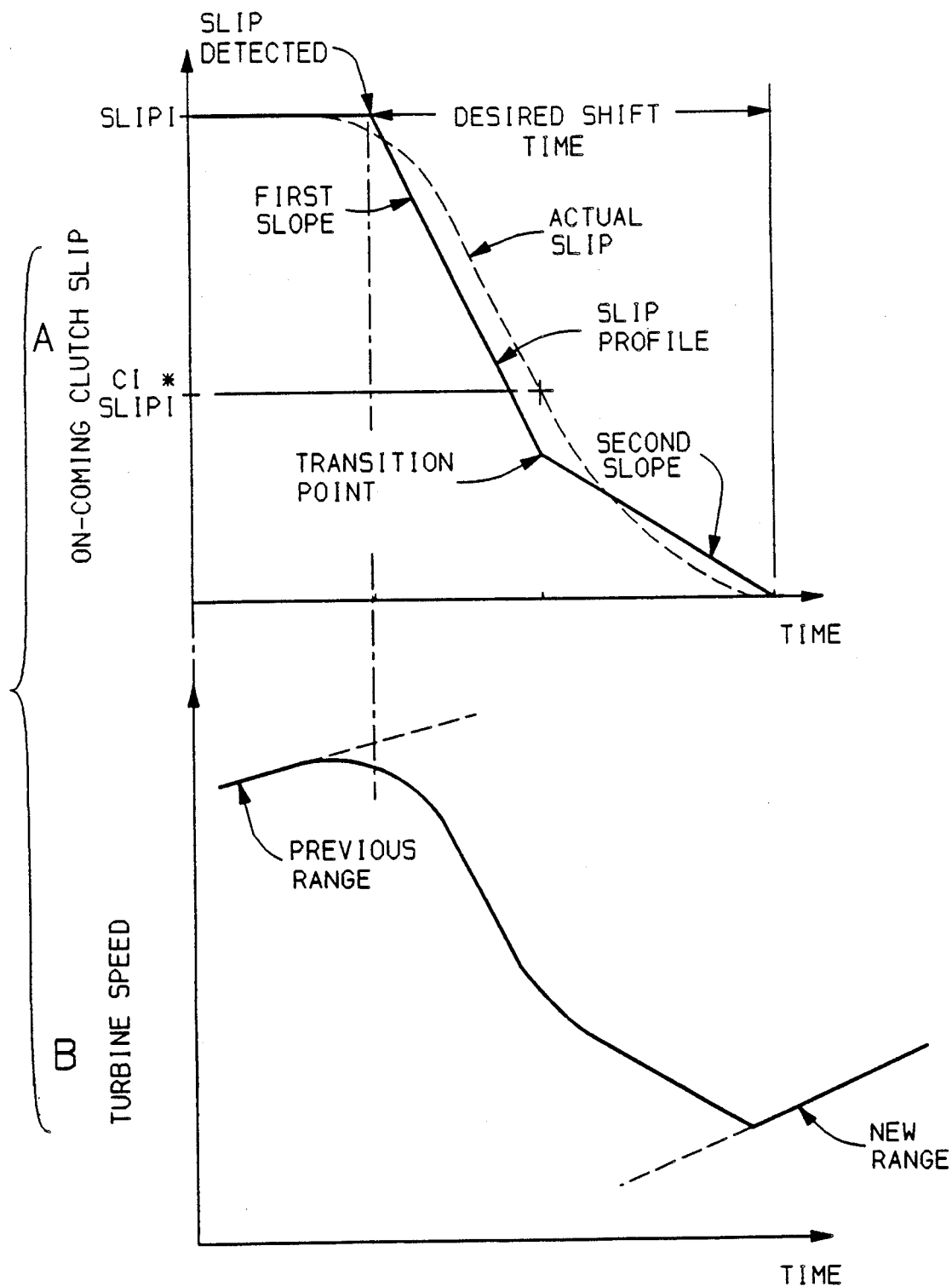
FIG. 5 is a slip diagram for the closed-loop operation of on-coming clutches.

The closed-loop control is better explained with reference to FIG. 5, which shows the on-coming slip speed profile in solid lines and actual slip speed in dashed lines. Slip speed is determined by comparing the turbine speed to the output speed. Specifically, slip speed is the absolute difference (times a conversion factor K4) between turbine speed and the product of the output speed, and the speed ratio of the intermediate range or the target range for the first and second on-coming clutches respectively, or SLIP=K4 * ABS[(Nt−(No*SR)]. The initial slip speed, SLIPI, is the slip speed value at the start of the closed-loop. The slip speed profile begins at that point and decreases at a fixed rate, called the first slope. Then at a determined point, the rate reduces to a second slope. The slopes are chosen so that, ideally, the actual slip speed can be made to smoothly go to zero within a given time period. The second slope is less steep than the first slope and reduces end of shift torque disturbance by more closely matching the acceleration rates on both sides of the first on-coming clutch. By using on-coming clutch slip speed as the control target, both turbine and output speeds are taken into account when controlling the shift duration.

To determine the slopes of the slip profile, three constants C1, C2 and C3 are defined. The constant C1 is a fraction of SLIPI at which the second slope begins; i.e., if SLIP≦C1*SLIPI, the slope changes to the second slope. The constant C2 is the desired time to utilize the first slope. The constant C3 is the desired overall closed-loop time. The constants C2 and C3 are used only for the slope calculation and not for direct timing purposes. The first and second slopes SLOPE1 and SLOPE2 are defined as:

SLOPE1=[SLIPI-(C1*SLIPI)]/C2, and

SLOPE2=C1*SLIPI/(C3−C2).

Separate profile calculations are made for the first and second on-coming clutches and different constants may be used.

The arrival at synchronization speed is determined by making several measurements in consecutive control loops. This assures that true synchronization has been achieved and maintained. If synchronization is assured, the closed-loop operation is terminated.

Figure 6:
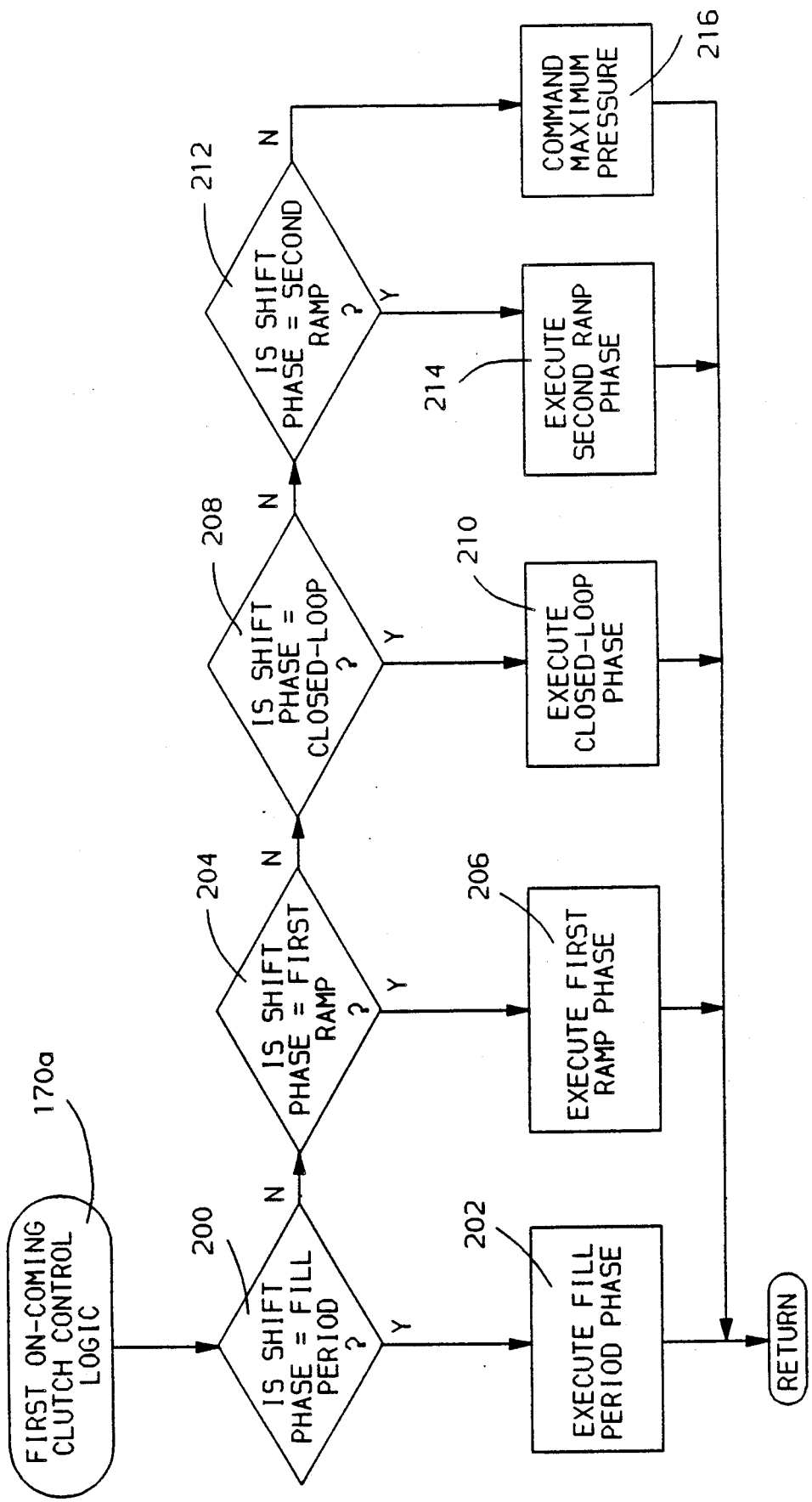
FIGS. 6 through 9 are flow diagrams for the first on-coming clutch control logic, according to the invention.

The flow charts of FIGS. 6-14 illustrate the control logic incorporated in the program for shift control. In these charts, SHIFT PHASE is a pointer for indicating the stage of shift process for each clutch. In FIG. 3b, the block 170 effects the on-coming clutch control for both on-coming clutches C3 and C6. FIG. 6 shows the logic flow for the first on-coming clutch control, designated 170a. If SHIFT PHASE is FILL PERIOD <200>, the Fill Period phase is executed <202>. If SHIFT PHASE is FIRST RAMP <204>, the First Ramp routine is run <206>. If SHIFT PHASE equals CLOSED-LOOP <208>, the Closed-Loop phase is executed <210>. If SHIFT PHASE equals SECOND RAMP <212>, the Second Ramp phase is executed <214>. If SHIFT PHASE is none of these, the maximum pressure is commanded <216>.

Figure 7:
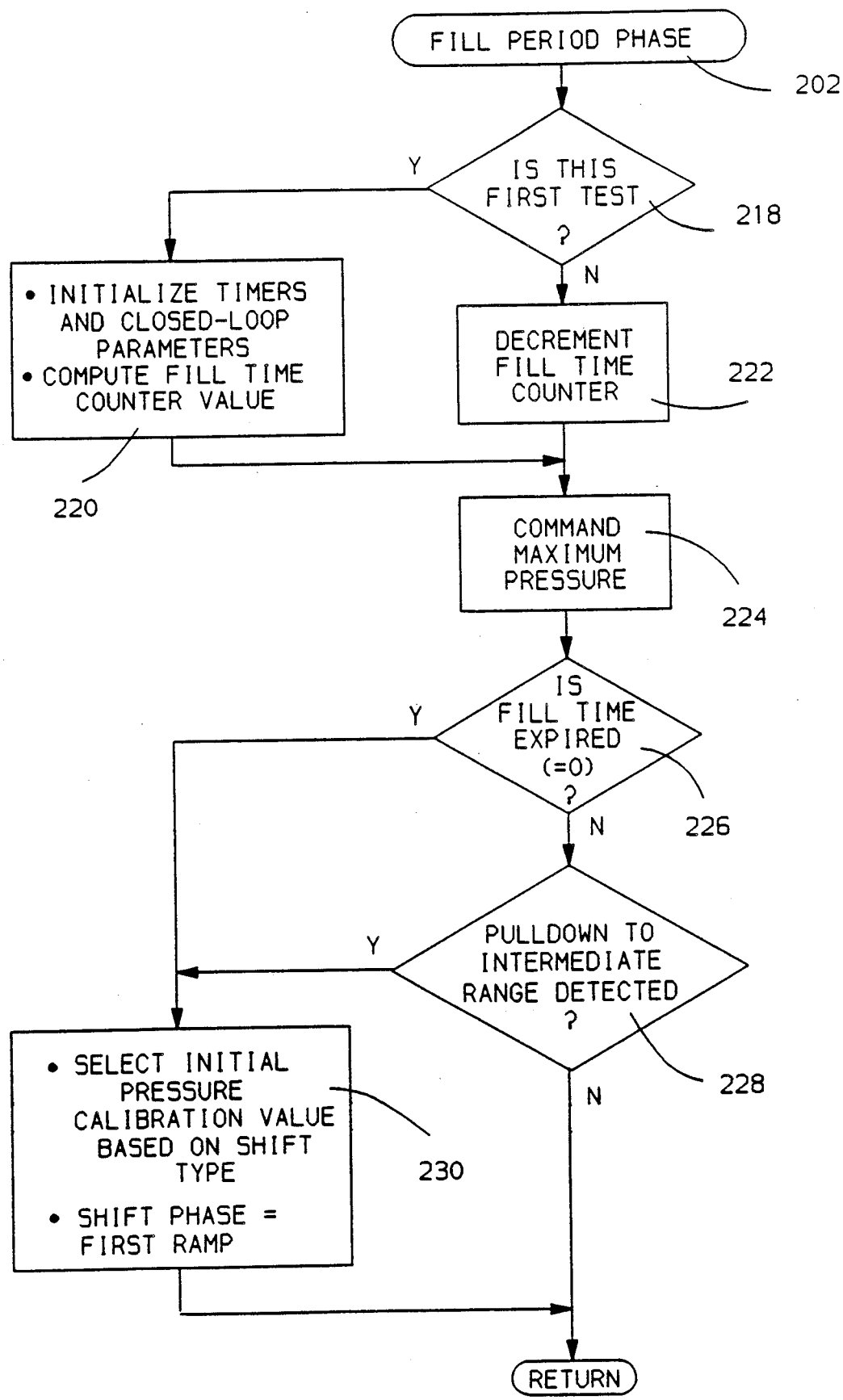

FIG. 7 shows the Fill Period phase logic 202. If it is the first time through the loop <218>, timers and closed-loop parameters are initialized and a FILL TIME counter value is computed <220>: if it is not the first time through the loop, the FILL TIME counter is decremented <222>. Next, the maximum pressure is commanded <224> and the routine returns to the main program. However, if the FILL TIME counter has decremented to zero <226> or pulldown is detected <228>, initial pressure is selected and the SHIFT PHASE is set to FIRST RAMP <230>.

Figure 8:
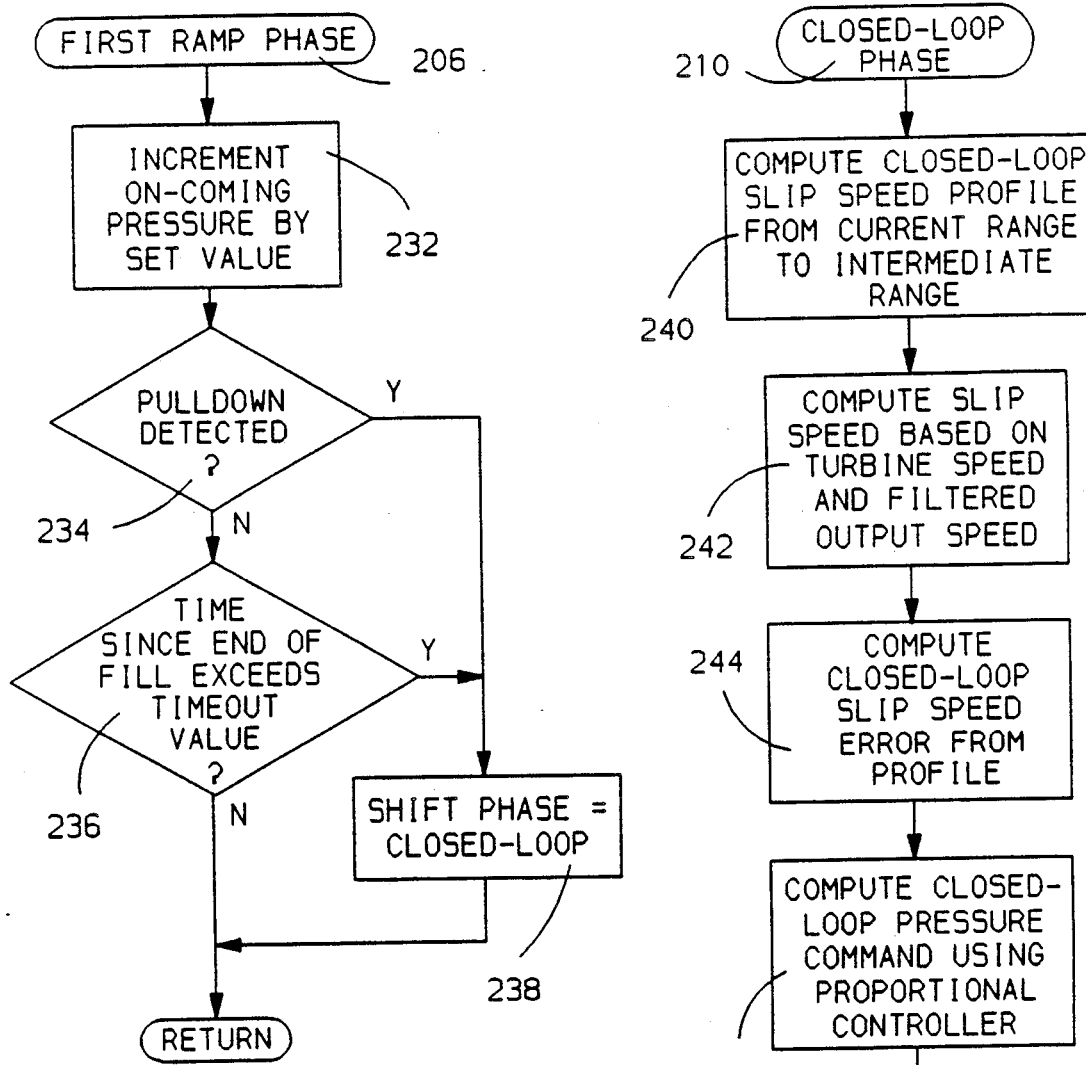

In the First Ramp phase 206, shown in FIG. 8, the on-coming pressure in incremented by a set value <232> and if pulldown is detected <234> or if the time from the end of fill is greater than a timeout value <236>, SHIFT PHASE is set to CLOSED-LOOP <238>. Otherwise the program continues to the main loop.

Figure 9:
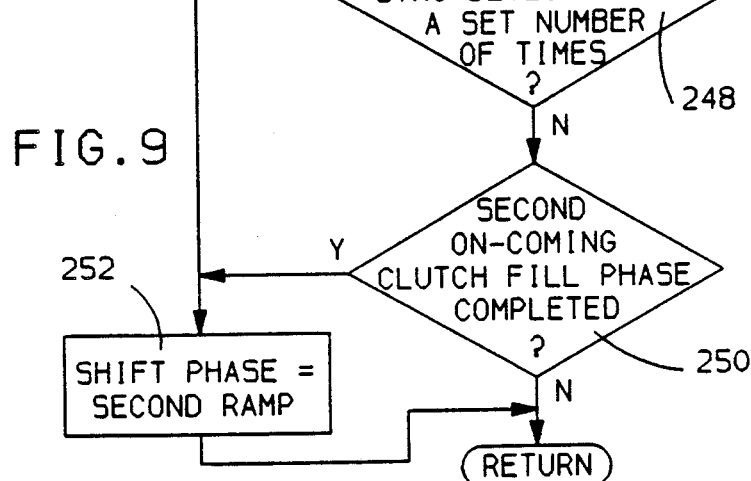

FIG. 9 shows the Closed-Loop phase 210 for shifting to the intermediate range. The closed-loop slip speed profile is computed <240>, the slip speed is computed based on turbine speed, filtered output speed, and the intermediate speed ratio <242>, the slip speed error is calculated <244>, and the closed-loop pressure command is computed using a proportional control <246>. Then, if intermediate range sync is detected for a set number of times <248> or the second on-coming clutch fill phase is completed <250>, SHIFT PHASE is set to SECOND RAMP <252>. The Second Ramp routine (not shown) increments the on-coming pressure by a set ramp value and then sets the SHIFT PHASE flag to END if a set number of consecutive target range syncs are detected or if the time since shift initiation exceeds a timeout value.

Figure 10:
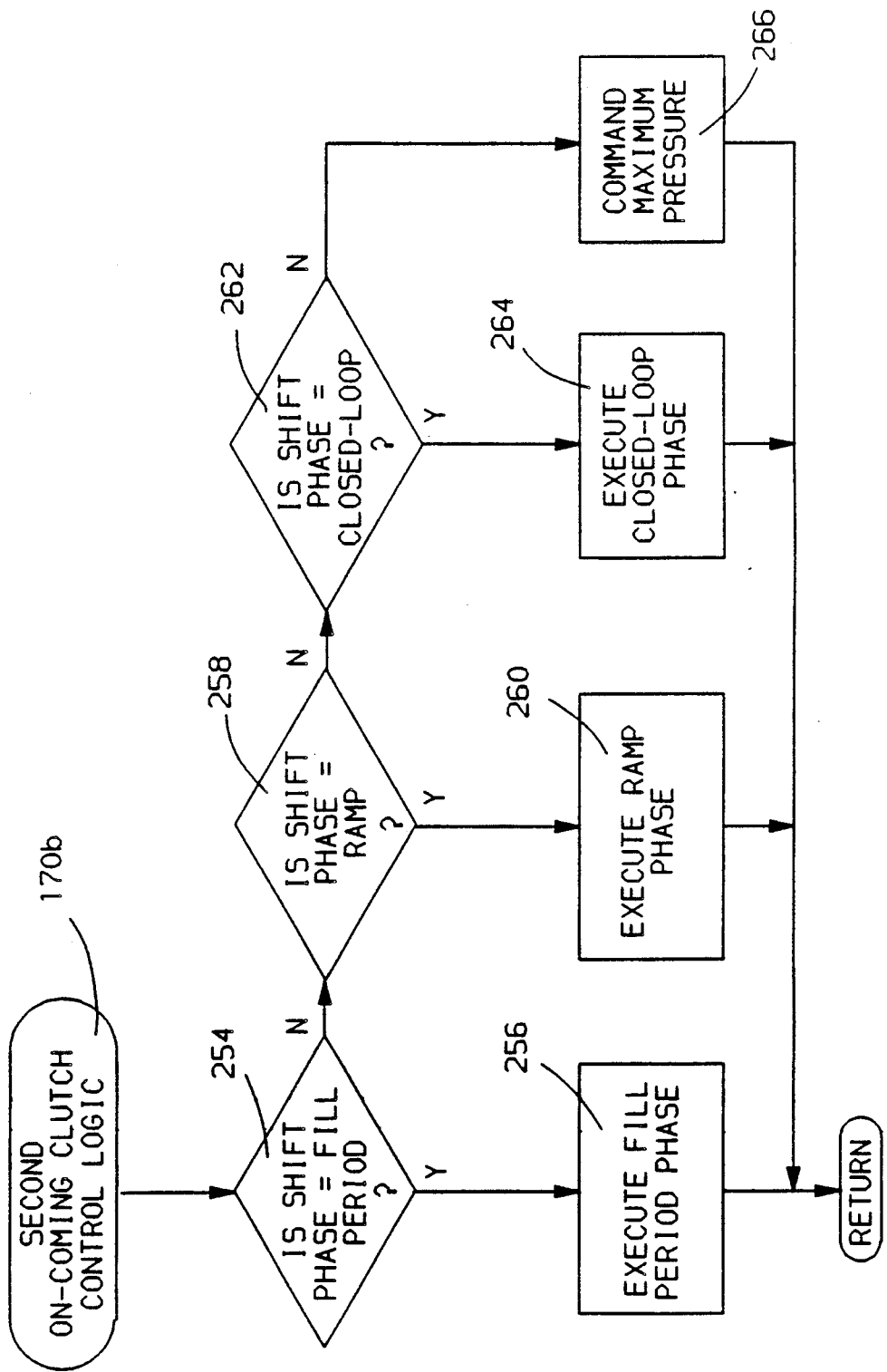
FIGS. 10 through 12 are flow diagrams for the second on-coming clutch control logic, according to the invention.

The second on-coming clutch control logic diagram, designated 170b, is shown in FIG. 10. If SHIFT PHASE is equal to FILL PERIOD <254>, the Fill period phase is executed <256>. If SHIFT PHASE is set to RAMP <258>, the Ramp phase is executed <260>. If SHIFT PHASE equals CLOSED-LOOP <262>, the Closed-Loop phase is executed <264>. If SHIFT PHASE equals none of these, the maximum pressure is commanded <266>.

Figure 11:
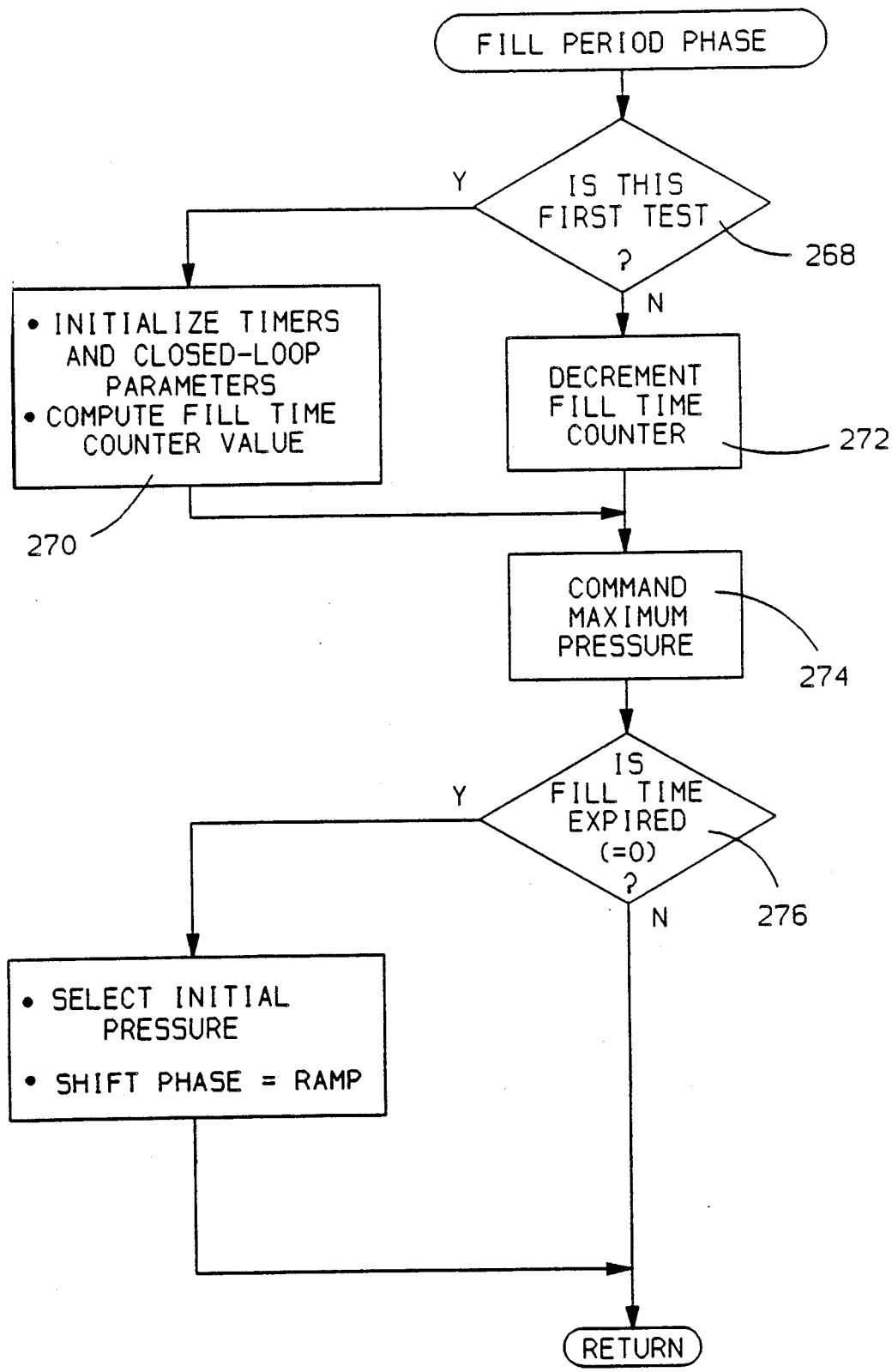

In the Fill Period phase 256, as shown in FIG. 11, if it is the first time through the loop <268>, timers and parameters are initialized and the FILL TIME counter value is computed <270>, and if not the first time, the FILL TIME counter is decremented <272>. Next, the maximum pressure is commanded <274> and the routine returns to the main program. However, if the fill time counter has decremented to zero <276>, initial pressure is selected and the SHIFT PHASE is set to RAMP <278>. The Ramp phase (not shown) increments the on-coming pressure command by a set value in each control loop. If pullup is detected (t4) or if the time since the end of fill period exceeds a timeout value, SHIFT PHASE is set to CLOSED-LOOP.

Figure 12:
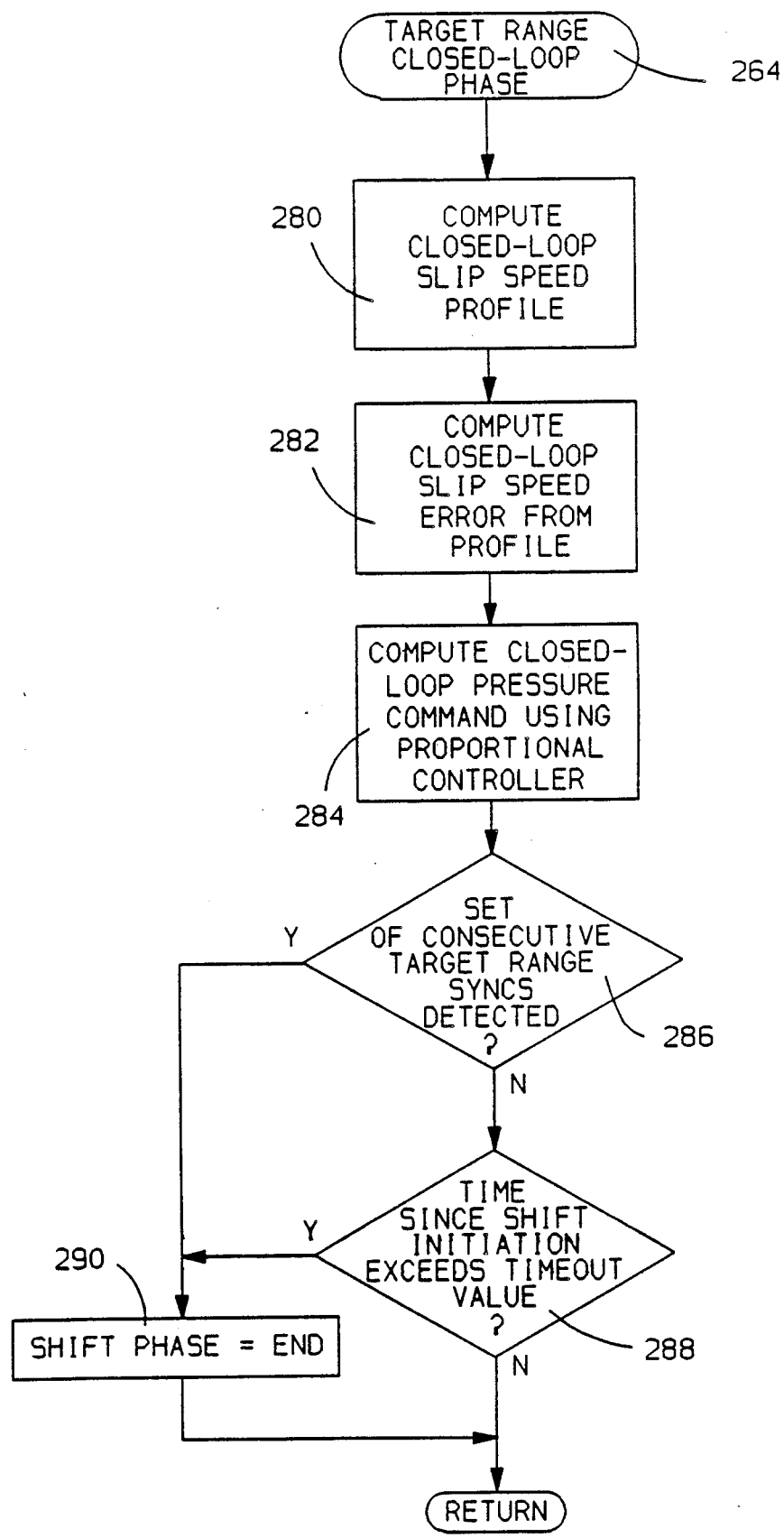

The closed-loop routine 264 of the second on-coming clutch is depicted in FIG. 12. The slip speed profile is calculated <280>, the slip speed error is computed from the profile, the turbine speed and the output speed <282>, and the closed-loop pressure command is computed using a proportional control <284>. If a set number of target range syncs are detected <286> or the time since shift initiation exceeds a timeout value <288>, the SHIFT PHASE is set to END <290> to complete the shift; otherwise the program returns to the main loop.

Figure 13:
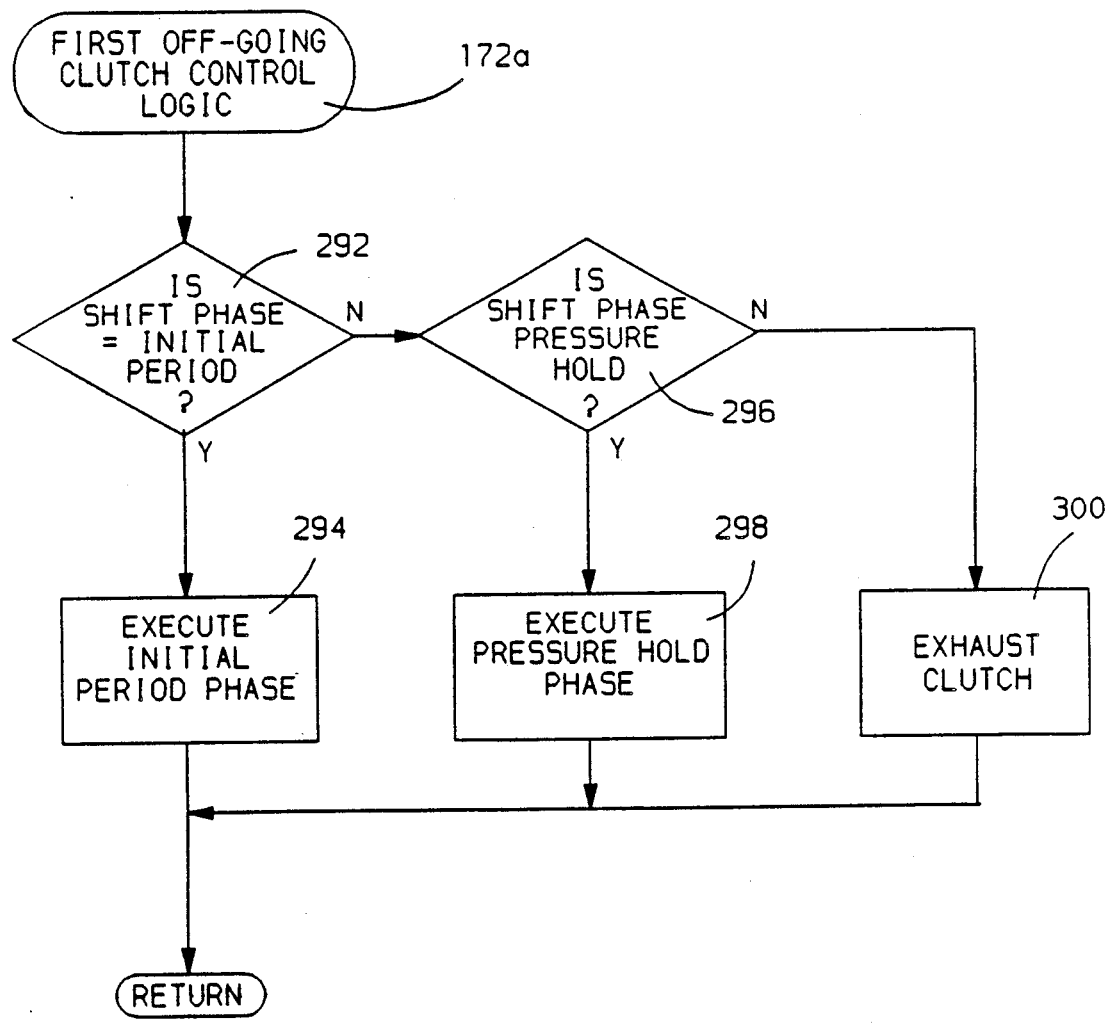
FIGS. 13 and 14 are flow diagrams for the first off-going clutch control logic, according to the invention.

The off-going clutch control block 172 of FIG. 3a includes the first off-going clutch control logic, designated 172a, and second off-going clutch control logic, designated 172b. The logic diagram for the first off-going clutch C5 is shown in FIG. 13. If SHIFT PHASE equals INITIAL PERIOD <292>, the Initial Period phase is executed <294>. If SHIFT PHASE is set to PRESSURE HOLD <296>, the Pressure Hold routine is executed <298>. Otherwise, the clutch is exhausted <300>.

Figure 14:
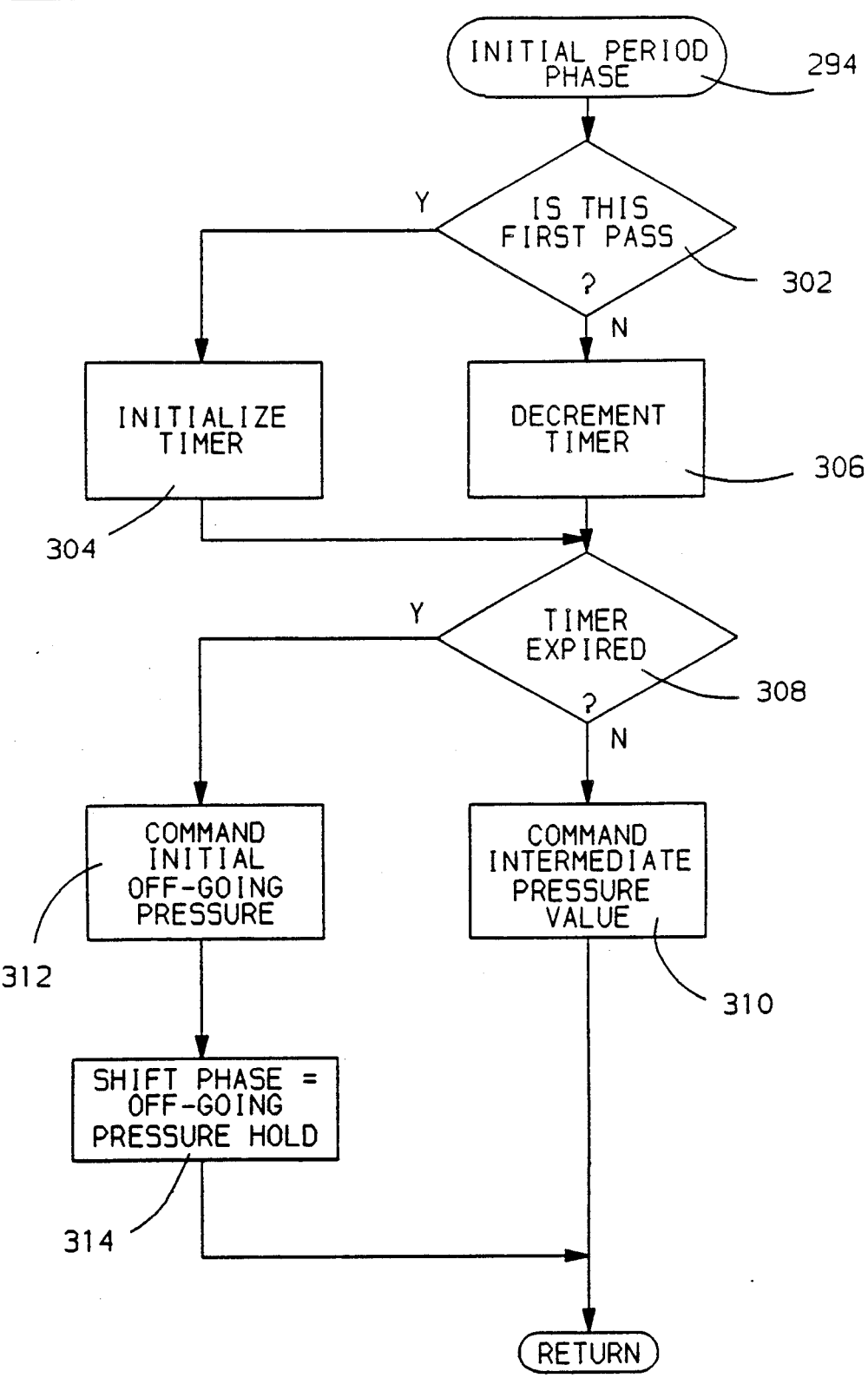

The Initial Period phase 294 diagram is shown in FIG. 14. If it is the first time through the loop <302>, a timer is initialized <304>; otherwise the timer is decremented <306>. If the timer has not expired <308>, an intermediate pressure value Pint is commanded (t1) <310>. If the timer has expired <308>, an initial off-going pressure Pin5 is commanded <312> and SHIFT PHASE is set to PRESSURE HOLD <314>. In the Pressure Hold phase (not shown), the initial off-going pressure is held until the fill period of the on-coming clutch C3 is complete, whereupon SHIFT PHASE for the first off-going clutch logic is set to END to cause the clutch C5 pressure to exhaust.

The second off-going clutch C1 is simply controlled by holding the commanded pressure full on until an offset time before the second on-coming clutch end of fill, and then is released as the second on-coming clutch C6 is preparing to assert some torque capacity.

While this invention has been described in reference to the illustrated embodiment, it is expected that various modifications will occur to those skilled in the art. In this regard, it will be understood that systems incorporating such modifications may fall within the scope of this invention, which is defined by the appended claims.

The embodiments of the invention in which an exclusive property or privilege is claimed are defined as follows:

1. In a vehicular automatic transmission having an input and an output, a turbine connected to the input to couple driving torque thereto, in which a downshift from a first transmission speed ratio to a second speed ratio is carried out through concurrent disengagement of first and second off-going fluid pressure operated torque transmitting devices associated with the first of such speed ratios and engagement of first and second on-coming fluid pressure operated torque transmitting devices associated with the second of such speed ratios, wherein the engagement of the second off-going torque transmitting device and the first on-coming torque transmitting device effects a third speed ratio lower than the second speed ratio, and further having turbine and output speed sensing means, the method of controlling the torque transmitting devices to effect closed throttle downshifting from the first speed ratio to the second speed ratio comprising the steps of:
  effecting a shift to the third speed ratio by releasing the first off-going torque transmitting device and gradually engaging the first on-coming torque transmitting device while the second off-going torque transmitting device is still engaged, so that the turbine speed gradually decreases relative to the output speed,
  determining from the turbine speed, the output speed and the third speed ratio when the relative speeds attain a third ratio synchronism, and
  effecting the second ratio by releasing the second off-going torque transmitting device, gradually engaging the second on-coming torque transmitting device and gradually completing the engagement of the first on-coming torque transmitting device.

2. The invention as defined in claim 1, wherein the step of effecting a shift to the third speed ratio comprises:
  controllably releasing the first off-going torque transmitting device and at the same time gradually engaging the first on-coming torque transmitting device, and
  when turbine speed pulls down below the speed consistent with the first speed ratio, applying a closed-loop control to the first on-coming torque transmitting device whereby the slip speed of the first on-coming torque transmitting device is controlled to a slip speed profile to attain synchronous speed for the third speed ratio.

3. The invention as defined in claim 2 wherein the step of effecting the third ratio includes:
  detecting when the turbine speed attains synchronous speed for the third speed ratio, and
  terminating the closed-loop control when synchronous speed for the third ratio is detected.

4. The invention as defined in claim 1 wherein the step of gradually engaging the second on-coming torque transmitting device includes,
  detecting turbine speed pullup as a result of on-coming torque transmitting device engagement,
  when pullup is detected, initiating closed-loop control of the second on-coming device whereby the device is controlled in accord with a slip speed profile to effect the second speed ratio, and
  terminating the closed-loop control of the second on-coming device and fully engaging the second on-coming device when synchronous speed for the second speed ratio is detected.

5. The invention as defined in claim 4 wherein synchronous speed for the second speed ratio is determined when the turbine speed is substantially equal to the product of the output speed and the second speed ratio, and further including the step of commanding maximum pressure on both on-coming torque transmitting devices when such synchronous speed has been detected for a set number of times.

6. In a vehicular automatic transmission having an input and an output, a turbine connected to the input to couple driving torque thereto, in which a downshift from a first transmission speed ratio to a second speed ratio is carried out through concurrent disengagement of first and second off-going fluid pressure operated torque transmitting devices associated with the first of such speed ratios and engagement of first and second on-coming fluid pressure operated torque transmitting devices associated with the second of such speed ratios, wherein the engagement of the second off-going torque transmitting device and the first on-coming torque transmitting device effects a third speed ratio lower than the first speed ratio, and further having turbine and output speed sensing means, the method of controlling the torque transmitting devices to effect closed throttle downshifting from the first speed ratio to the second speed ratio comprising the steps of:
  effecting a shift to the third speed ratio by releasing the first off-going torque transmitting device and at least partially engaging the first on-coming torque transmitting device while the second off-going torque transmitting device is still engaged, and then
  effecting a shift to the second ratio by releasing to the second speed ratio by releasing off-going torque transmitting device, engaging the second on-coming torque transmitting device and completing the engagement of the first on-coming torque transmitting device.

* * * * *